United States Patent [19]

Taunton

[11] 4,355,828
[45] Oct. 26, 1982

[54] UNIVERSAL PLASTIC FLANGE FOR CONNECTING URINALS TO DRAIN PIPES

[76] Inventor: Raymond F. Taunton, 11541 Holton Rd., Jacksonville, Fla. 32219

[21] Appl. No.: 58,615

[22] Filed: Jul. 18, 1979

Related U.S. Application Data

[63] Continuation of Ser. No. 726,132, Sep. 27, 1976.

[51] Int. Cl.³ .................................................. F16L 17/00
[52] U.S. Cl. .................................... 285/342; 285/174; 285/363; 285/DIG. 16; 4/252 R
[58] Field of Search ............... 285/363, 423, 337, 56, 285/57, 58, 59, 60, 64, 405, 413, 177, 342, 343, DIG. 16; 4/252 R, 99, 104, DIG. 7, 301

[56] References Cited

U.S. PATENT DOCUMENTS

| | | | |
|---|---|---|---|
| 56,326 | 7/1866 | Paterson | 285/363 |
| 1,106,726 | 8/1914 | McCloskey | 285/59 |
| 1,217,965 | 3/1917 | Lloyd | 285/59 |
| 1,505,683 | 8/1924 | Wyatt et al. | 285/93 |
| 2,257,500 | 9/1941 | Hoffmann | 4/252 R |
| 2,743,460 | 5/1956 | Youngstrom et al. | 4/252 R |
| 3,059,697 | 10/1962 | Pitts | 285/DIG. 16 |
| 3,263,244 | 8/1966 | Katz | 285/58 |
| 3,579,670 | 5/1971 | Frank | 4/252 R |
| 3,727,955 | 4/1973 | Carter | 285/223 |
| 3,905,052 | 9/1975 | DeAngelis | 285/56 |
| 3,921,229 | 11/1975 | Yavitch | 4/252 R |

Primary Examiner—Dave W. Arola
Attorney, Agent, or Firm—Birch, Stewart, Kolasch & Birch

[57] ABSTRACT

A universal plastic economical connection for the art of connecting urinals to drain pipes which will eliminate the conventional time consuming and relatively costly steps required of the prior art. This connection will readily fit two-inch (2") diameter pipe currently used by plumbers, thereby eliminating the costly use of threaded adapters and transitions to other materials.

4 Claims, 8 Drawing Figures

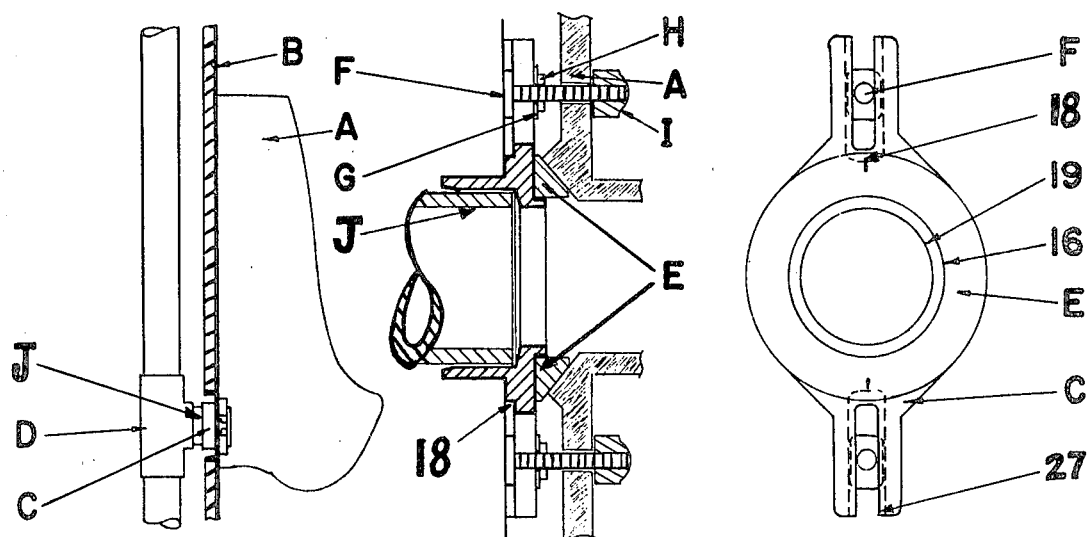
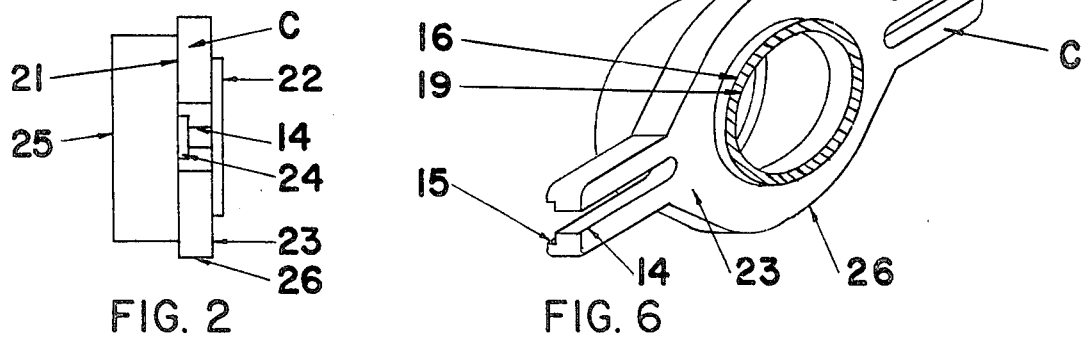
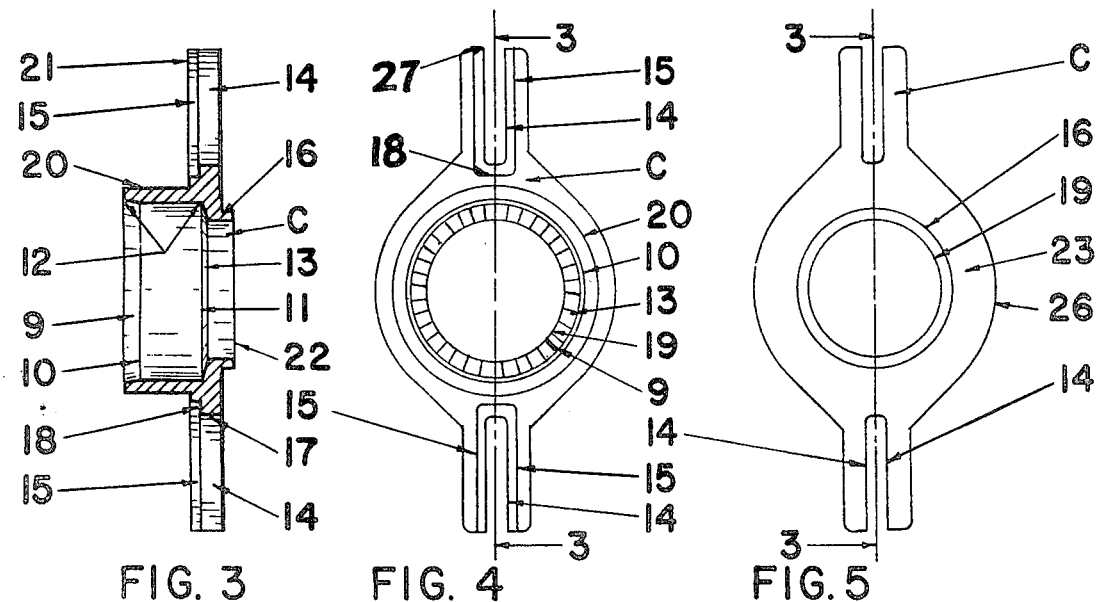

4,355,828

UNIVERSAL PLASTIC FLANGE FOR CONNECTING URINALS TO DRAIN PIPES

This application is a continuation, of copending application Ser. No. 726,132, filed on Sept. 27, 1976.

BACKGROUND OF THE INVENTION

This invention pertains to the art of connecting all wall hung urinals with integral traps to plastic drain pipes. An important object of the present invention is to eliminate the costly materials and man-hours currently used in the installation of wall hung urinals. This invention can be used in any plastic system where wall hung urinals which have integral traps are to be installed.

There are different methods currently used for connecting the drain outlet of a wall hung urinal, most of which involve the use of a brass threaded flange, adapters, expensive copper and copper fittings which consequently require the use of a torch to solder joints of said fittings, pipe and adapters. There are numerous disadvantages encountered by using these methods such as not calculating proper distances of the flange from the finished wall and the possibility of leaks if extreme caution is not used when soldering or tightening threaded joints—not to mention the man-hours used to perform these functions and the high cost of threaded adapters and extra materials.

It would be desirable to have a flange fabricated from a plastic material that will eliminate all of the above disadvantages by one simple step. When roughing the system with a plastic material, it would only be necessary to connect the flange with the proper solvent or cement which properly seals the joint. This will eliminate the need of the transition from a non-compatible material or the use of a threaded adapter to connect the drain pipe to the urinal. There will be no complicated calculations to be made as this universal flange fits flush against the finished wall, no copper fittings to be soldered as this flange will be installed with all solvent or cement joint connections and will virtually eliminate all possibility of leaks.

It is the intention of the present invention to eliminate a substantial portion of the existing cost of labor and materials used in roughing and connecting all wall hung urinals with integral traps using the present method of installation. It is not, however, the intention of the present invention to connect any wall hung urinals which have external traps. Urinals with external traps are rarely used because the advantages of using urinals with integral traps far exceed and advantages of external traps.

SUMMARY

Brass threaded flanges of a general type are well known in the art but as a whole are characterized by many inherent disadvantages. It has been discovered by the use of the present invention fabricated from a plastic material to combination with a conformable means for sealing such as a gasket placed between the flange and the pottery of the urinal, and the enlongated openings for universal adaptability to all wall hung urinals with integral traps eliminates the disadvantages of the prior art. It is desirable to have a flange fabricated from a plastic material which will be compatible with the system being installed that is not subject to corrosion or deterioration after long periods of use. It is molded in a two-piece injection type mold in such a manner as to be ready for use after removal from the mold with no machining required.

Such a flange comprises a tubular section which has a proximal end, the outside diameter of which is greater than the inside diameter of the drain outlet of the urinal. The distal end of the tubular section has both an inside and an outside diameter sized so as to be compatible with the gasket that is placed thereon.

More specifically, the flange of the present invention comprises a body member having an outer periphery and a circular inner periphery defining a central hole axially through the body. The body has front and rear surfaces defined by a wall extending between the outer and inner peripheries. The outer periphery of the body is displaced rearwardly from the hole a predetermined distance. The inner periphery of the circular hole has a predetermined dimension which will easily accept connecting to the drain pipe.

It is an important object of the present invention to provide a flange fabricated from a plastic material which is very economical to manufacture and simple to install.

It is an additional important object of the present invention to provide a flange which is molded in one-piece designed to eliminate costly threaded adapters and extra materials and man-hours presently used in installing all wall hung urinals having integral traps.

This invention has a very unique feature which will enable the spread of the connecting bolts to be easily adjusted to fit the many different spreads of wall hung urinals presently manufactured with integral traps. This invention will provide a universal flange that will eliminate the need for plumbers and contractors to have their money tied up in unnecessary inventories with flanges specifically designed to do just one job.

Other objects and advantages of the invention will become apparent during the course of the following description.

DESCRIPTION OF THE PREFERRED EMBODIMENT

Referring now to the drawings where in the showings are for purposes of illustrating the preferred embodiment of the invention only and not for purposes of limiting the same. In this showing:

FIG. 1 is a side elevational view of a plumbing installation having the universal urinal flange of the present invention incorporated therein.

FIG. 2 is an end elevational view of the present invention.

FIG. 3 is a cross-sectional elevational view taken on line 3—3 of FIGS. 4 and 5.

FIG. 4 is a rear plan view of the present invention.

FIG. 5 is a front plan view of the present invention.

FIG. 6 is an isometric plan view showing the front view on a standard 30° angle to the horizontal.

FIG. 7 is a front view of the universal plastic flange of the present invention showing connecting bolts and gasket in place.

FIG. 8 is a top elevational cross-sectional view showing connecting bolts, gasket and urinal in place.

FIG. 1 shows wall hung urinal A hanging on finished wall B and connected to universal plastic flange C of which socket of flange C is quickly sealed to standard 2" diameter plastic drain pipe J with a solvent cement. Standard drain pipe J is quickly sealed to plastic drainage tee fitting D by use of a solvent cement. Note that the drain pipe marked J is standard 2" diameter because it is a known fact in the art that all wall hung urinals having integral traps require a 2" diameter drainage connection.

FIG. 2 shows an end elevational view of flange C. 14 is the innermost edge of the connecting bolt track of C. 24 is bolt head track. 22 outlines the outermost surface of the front part of C. This is shown in FIG. 3. 23 is front part of C that faces drain outlet of A which receives the most rearwardly part of gasket E as shown in FIGS. 7 and 8. 23 is also shown in FIGS. 5 and 6. 26 shows the outermost periphery of flange C also shown in FIGS. 5 ad 6. 21 illustrates the most rearwardly part of main embodiment of C which fits flush against the finished wall. 25 is the most rearwardly part of flange C drain outlet.

FIG. 3 is a cross-sectional elevational view of C taken on line 3—3 of FIGS. 4 and 5. 21 illustrates the most rearwardly part of main embodiment of C which fits flush against the finished wall. This is also shown in FIG. 2. 15 is the outermost edge of bolt head track of C. This is also shown in FIGS. 4 and 6. 20 illustrates the outermost periphery of the socket drain outlet of C. See 20 also in FIG. 4. 12 is the drain outlet socket of C having a minimum length of 0.750". 9 illustrates drain outlet socket entrance taper of C which is necessary to allow the easy entry of the drain pipe J as shown in FIGS. 1 and 8. 9 is also shown in FIG. 4. 10 is the drain socket entrance of C. The inner periphery requiring a perdetermined dimension to receive standard 2" plastic pipe J as shown in FIGS. 1 and 8. 10 is also shown in FIG. 4. 18 is the most inwardly portion of the bolt head track 24 of C. This design is necessary to allow the connecting bolt F to slide in the minimum distance required for connecting all wall hung urinals A having integral traps and requiring a 4" spread between connecting bolts F. This is also shown in FIG. 4, FIG. 7, and FIG. 8. 14 is the innermost edge of the connecting bolt track of C. Also shown in FIG. 2, FIG. 4, FIG. 5, and FIG. 6. 16 is the outermost periphery of the extrusion to receive the gasket E which seals flange C to urinal A. This is also shown in FIGS. 5 and 6. 13 illustrates the most rearwardly part of the inner periphery as shown in FIG. 4. FIG. 5, FIG. 6, and FIG. 7 at which point 13 has the beginning of a design required taper extending diagonally and rearwardly to termination point 11. 13 is also shown in FIG. 4. 11 is the most inwardly part of the socket drain outlet comprised of a predetermined inner periphery to receive standard 2" plastic pipe J as shown in FIGS. 1 and 8. 17 is the most inwardly part of the bolt track of C. This is also shown in FIGS. 7 and 8.

FIG. 4 item 19 illustrates the inner periphery of extrusion of C. Also shown in FIG. 5, FIG. 6, and FIG. 7. 27 is the most outwardly portion of bolt track of C. This design enables this invention to accommodate all wall hung urinals with integral traps requiring an extremely wide bolt spread. This feature is one of the most unique items of the present invention. This is also shown in FIG. 7.

FIG. 7 item E is the gasket which is applied around 16 on C. This gasket is required to make the necessary water tight seal between A and C. You will note that F is shown in FIG. 7 at an intermediate spacing which enables this invention to accommodate all wall hung urinals with integral traps that require an intermediate bolt spread. This is again emphasizing the unique feature of the present invention. E is also shown in FIG. 8.

FIG. 8 item G illustrates metal washer in position on F against C. H is a jam nut which is necessary to secure F in a predetermined bolt spread to align with holes in pottery of A for connection. I illustrates a finished acorn nut that when properly tightened compresses E to a water tight seal between the drain outlet of A and the drain inlet of C.

It is to be understood that the form of my invention herewith shown and described is to be taken as a preferred example of the same and that various changes in the shape, size and arrangment of parts may be resorted to without departure from the spirit of the invention or the scope of the subjoined claim.

Having thus described my invention, I claim:

1. An outlet joint structure for interconnecting an in-wall drain pipe having a horizontally disposed annular intake extension with a wall hung urinal having an annular outlet port in a wall adjacent surface thereof such that said intake extension and said outlet port are substantially coaxially disposed, and said urinal further including an outwardly bevelled annular boss extending horizontally outward on said wall adjacent surface thereof about the periphery of the mouth of said annular outlet port in the provision of a flared sealing surface, said joint structure comprising:

universal flange means interconnecting through said wall, said horizontally disposed intake extension and said outlet port of said urinal, and having an annular body portion defining a stepped bore therethrough;

said stepped bore comprising an enlarged diameter portion adjacent said intake extension and a reduced diameter portion adjacent said outlet port of said urinal in the provision of an internal annular boss in the innermost extent of said enlarged diameter portion;

said enlarged diameter portion of said stepped bore telescopically receiving said horizontal intake extension with the outermost end of the latter abutting said internal annular boss, and adhesive means holding said outermost end in said abutment with said boss;

a horizontally extending, annular shoulder on said annular body portion about the mouth of said reduced diameter bore portion and extending toward the said mouth of said outlet port of said urinal;

an annular sealing gasket mounted on said shoulder and having a bevelled annular seating surface thereon of a compatible taper, size, and orientation for engaging and sealing with the said flared sealing surface at the mouth of said annular outlet port of said urinal;

said universal flange means further comprising a pair of diametrically opposed mounting ears extending outboard of said annular body portion over the urinal adjacent plane of said wall on which the said urinal is hung;

each of said ears including radially extending slots in the provision of a bifurcated channel defining an elongated bolt head receiving recess between a said ear and the said urinal adjacent plane of said wall;

said urinal having diametrically disposed mounting ports external to said annular boss in said wall adjacent surface thereof;

bolt means having heads slidably mounted in said bolt head receiving recesses of said mounting ears and thereby positioned in registry with and extending through said mounting ports in said urinal; and means engaging said bolt means to draw said annular sealing gasket into a full sealing engagement with said flared sealing surface and said flange means.

2. The invention defined in claim 1, wherein said horizontal intake extension on said drain pipe is adhesively sealed in said enlarged diameter portion of said stepped bore.

3. The invention defined in claim 1, which further includes locking means intermediate said mounting ears and said urinal and engaged with said bolt means to fix said bolt heads and said bolt means on said ears in registry with said mounting ports in said urinal.

4. The invention defined in claim 3, wherein said horizontal intake extension on said drain pipe is adhesively sealed in said enlarged diameter portion of said stepped bore.

* * * * *

UNITED STATES PATENT AND TRADEMARK OFFICE
CERTIFICATE OF CORRECTION

PATENT NO. : 4,355,828
DATED : October 26, 1982
INVENTOR(S) : Raymond F. Taunton It is certified that error appears in the above—identified patent and that said Letters Patent is hereby corrected as shown below:

On the title page,
After category "[75] Inventors" insert the following category:

-- [73] Assignee: K.T. Industries, Inc.
Jacksonville, Florida --

Signed and Sealed this

Twenty-second Day of March 1983

[SEAL]

Attest:

GERALD J. MOSSINGHOFF

Attesting Officer   Commissioner of Patents and Trademarks